United States Patent
Hirata et al.

(10) Patent No.: US 10,266,910 B2
(45) Date of Patent: Apr. 23, 2019

(54) STEEL SHEET HOT-DIP-COATED WITH ZN—AL—MG-BASED SYSTEM HAVING EXCELLENT WORKABILITY AND METHOD FOR MANUFACTURING SAME

(71) Applicant: Nisshin Steel Co., Ltd., Tokyo (JP)

(72) Inventors: Kentarou Hirata, Tokyo (JP); Shinya Uesugi, Tokyo (JP); Yukio Katagiri, Hiroshima (JP); Masaaki Uranaka, Osaka (JP); Tomoharu Shigetomi, Hiroshima (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 257 days.

(21) Appl. No.: 15/105,791

(22) PCT Filed: Dec. 19, 2014

(86) PCT No.: PCT/JP2014/083712
§ 371 (c)(1),
(2) Date: Jun. 17, 2016

(87) PCT Pub. No.: WO2015/093596
PCT Pub. Date: Jun. 25, 2015

(65) Prior Publication Data
US 2016/0319386 A1    Nov. 3, 2016

(30) Foreign Application Priority Data
Dec. 19, 2013 (JP) .................................. 2013-262271

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01);
(Continued)

(58) Field of Classification Search
CPC ................ C21D 8/0226; C21D 8/0263; C21D 2211/002; C21D 2211/004;
(Continued)

(56) References Cited

FOREIGN PATENT DOCUMENTS

| CN | 103415641 A | 11/2013 |
|---|---|---|
| EP | 2 407 569 A1 | 1/2012 |

(Continued)

OTHER PUBLICATIONS

Machine Translation, Hirata et al., JP 2011-153361, Aug. 2011. (Year: 2011).*

(Continued)

*Primary Examiner* — Michael E. La Villa
(74) *Attorney, Agent, or Firm* — Rothwell, Figg, Ernst & Manbeck, P.C.

(57) ABSTRACT

A steel sheet hot-dip coated with a Zn—Al—Mg-based system, wherein the steel sheet material has a predetermined chemical composition; a Ti/C equivalent ratio represented by Formula (1) described in the specification is 0.4 to 1.5; a bainitic ferrite single phase or a phase including a bainitic ferrite phase and a ferrite phase exists as a main phase; the area ratio of a hard second phase and cementite is 3% or less; the ratio of small-angle boundaries with a difference in crystal orientation of 2° to 15° is 30% to 75%; and Ti-containing carbides having an average particle size of 20 nm or less are dispersed and precipitated and a method of manufacturing thereof.

6 Claims, 2 Drawing Sheets

(51) Int. Cl.
| | |
|---|---|
| C23C 2/40 | (2006.01) |
| C23C 2/02 | (2006.01) |
| C23C 2/06 | (2006.01) |
| C22C 38/14 | (2006.01) |
| C22C 38/12 | (2006.01) |
| C22C 38/04 | (2006.01) |
| C22C 38/02 | (2006.01) |
| C22C 38/00 | (2006.01) |
| C22C 38/06 | (2006.01) |
| C22C 18/00 | (2006.01) |
| C22C 18/04 | (2006.01) |
| B32B 15/01 | (2006.01) |
| C23C 30/00 | (2006.01) |
| B32B 15/04 | (2006.01) |
| B32B 15/18 | (2006.01) |
| B32B 15/20 | (2006.01) |

(52) U.S. Cl.
CPC .......... *B32B 15/043* (2013.01); *B32B 15/18* (2013.01); *B32B 15/20* (2013.01); *C21D 8/0205* (2013.01); *C21D 8/0226* (2013.01); *C21D 8/0263* (2013.01); *C21D 8/0278* (2013.01); *C22C 18/00* (2013.01); *C22C 18/04* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/40* (2013.01); *C23C 30/00* (2013.01); *C23C 30/005* (2013.01); *C21D 2211/002* (2013.01); *C21D 2211/004* (2013.01); *C21D 2211/005* (2013.01); *Y10T 428/12757* (2015.01); *Y10T 428/12799* (2015.01); *Y10T 428/12972* (2015.01); *Y10T 428/12979* (2015.01)

(58) Field of Classification Search
CPC .......... C21D 2211/005; C21D 8/0278; C21D 8/0205; C21D 9/46; C23C 2/06; C23C 2/02; C23C 2/40; C23C 2/12; C23C 30/00; C23C 30/005; C23C 2/00; C22C 38/001; C22C 18/00; C22C 18/04; C22C 38/06; C22C 38/04; C22C 38/02; C22C 38/004; C22C 38/002; C22C 38/12; C22C 38/00; C22C 38/14; C22C 21/10; B32B 15/013; B32B 15/012; B32B 15/04; B32B 15/043; B32B 15/18; B32B 15/20; Y10T 428/12757; Y10T 428/12799; Y10T 428/12972; Y10T 428/12979

See application file for complete search history.

(56) References Cited

FOREIGN PATENT DOCUMENTS

| | | | |
|---|---|---|---|
| JP | 2007-302992 | * | 11/2007 |
| JP | 2007-302992 A | | 11/2007 |
| JP | 2011-144429 A | | 7/2011 |
| JP | 2011-153361 | * | 8/2011 |
| JP | 2011-153361 A | | 8/2011 |
| JP | 2013-95996 A | | 5/2013 |
| JP | 2013-133485 A | | 7/2013 |
| JP | 2013-133497 A | | 7/2013 |
| RU | 2384648 C2 | | 3/2010 |
| WO | 2012/118073 A1 | | 9/2012 |
| WO | 2013160871 A1 | | 10/2013 |

OTHER PUBLICATIONS

Machine Translation, Otsuka et al., JP 2007-302992, Nov. 2007. (Year: 2007).*

International Search Report for PCT/JP2014/083712 dated Mar. 3, 2015, 2 pages.

European Communication cited in Application No. 14873019.5-1373 dated May 31, 2017, 8 pages.

Chinese Communication cited in the counterpart foreign application No. 201480070046.9 dated May 31, 2017, 6 pages.

Communication issued for Russian Patent Application No. RU20160122482/20 dated Jun. 9, 2018, 7 pages.

* cited by examiner

STEEL SHEET HOT-DIP-COATED WITH ZN—AL—MG-BASED SYSTEM HAVING EXCELLENT WORKABILITY AND METHOD FOR MANUFACTURING SAME

CROSS-REFERENCE TO RELATED APPLICATIONS

The present application is a national stage filing under 35 U.S.C. § 371 of PCT/JP2014/083712, filed on 19 Dec. 2014, which in turn claims the benefit of priority to Japanese Application No. 2013-262271, filed 19 Dec. 2013. Each application is incorporated herein by reference in its entirety.

TECHNICAL FIELD

The present invention relates to a steel sheet hot-dip coated with a Zn—Al—Mg-based system and having a tensile strength of 400 MPa or greater and excellent ductility and hole-expandability, the sheet being suitable as a material for members which are to be processed, for example, by press working and stretch flanging, and used for applications requiring high corrosion resistance, and also to a method for manufacturing the steel sheet.

BACKGROUND ART

An interest in environmental issues has been steadily growing in recent years, and demand has accordingly been created for weight reduction based on stress increase and wall thickness reduction in a variety of machined parts, primarily automotive parts. Further, since processing in various deformation modes, such as press working and stretch flanging, is performed, steel sheets are required to have high ductility and hole-expandability in addition to strength. Furthermore, from the standpoint of extending service life and eliminating post-coating, high-strength rust-resistant steel sheets are needed.

Patent Literature 1 (PTL 1) discloses a hot-dip coated steel sheet with high strength and hole-expandability. However, since the strength is ensured by using a bainitic structure, which is a hard phase, the hole-expandability is high, but ductility is low.

Patent Literature 2 (PTL 2) suggests a ferritic single-phase steel sheet as a material with increased ductility and hole-expandability. However, since Mo is contained, the cost is significantly increased.

Patent Literatures 3 and 4 (PTL 3 and 4) suggest a multiphase steel sheet, in which the difference in hardness between ferrite and martensite is reduced, as a material with increased ductility and hole-expandability. However, since the martensite hardness is decreased, where the ferrite volume ratio is increased, the strength is reduced. Further, the hole-expandability is not necessarily high.

Patent Literature 5 (PTL 5) suggests a steel sheet hot-dip coated with a Zn—Al—Mg-based system and excelling in hole-expandability and corrosion resistance. However, it was found that high hole-expandability is not always easy to obtain even by following the method disclosed in this literature.

CITATION LIST

Patent Literature

[PTL 1]
Japanese Patent Application Publication No. H5-179356
[PTL 2]
Japanese Patent No. 3591502
[PTL 3]
Japanese Patent Application Publication No. 2001-303186
[PTL 4]
Japanese Patent Application Publication No. 2001-303187
[PTL 5]
Japanese Patent Application Publication No. 2012-193452

SUMMARY OF INVENTION

Technical Problem

Therefore, the steel sheets disclosed in PTL 1 to 5 mentioned hereinabove cannot be said to fulfill all of the requirements relating to strength, ductility, hole-expandability, and corrosion resistance.

With the foregoing in view, it is an objective of the present invention to provide a steel sheet hot-dip coated with a Zn—Al—Mg-based system, and having strength, ductility and hole-expandability suitable for working processes, such as press working and stretch flanging, and high corrosion resistance, and also to provide a method for manufacturing the steel sheet.

Solution to Problem

The comprehensive research conducted by the inventors has revealed that a coated steel sheet having the below-described features can resolve the abovementioned problem.

More specifically, the present invention uses a high-strength steel sheet hot-dip coated with a Zn—Al—Mg-based system and having a tensile strength of 400 MPa or greater and excellent workability, wherein a steel sheet material contains, in percent by mass, C: 0.005% to 0.08%, Si: 0.8% or less, Mn: 0.1% to 1.8%, P: 0.05% or less, S: 0.02% or less, N: 0.001% to 0.005%, Ti: 0.02% to 0.2%, B: 0.0005% to 0.01%, and Al: 0.1% or less, with the balance of Fe and unavoidable impurities; a bainitic ferrite single phase or a phase comprising a bainitic ferrite phase and a ferrite phase exists as a main phase; an area ratio of a hard second phase and cementite is 3% or less; the ratio of small-angle boundaries with a difference in crystal orientation of 2° to 15° is 30% to 75%; and Ti-containing carbides having an average particle size of 20 nm or less are dispersed and precipitated.

Further, in the relationship of Ti and C, the Ti/C equivalent ratio represented by Formula (1) below is required to be controlled to 0.4 to 1.5:

$$\text{Ti/C equivalent ratio} = (\text{Ti}/48)/(\text{C}/12) \tag{1}$$

where the symbol of each element in Formula (1) is substituted by the content (mass %) of the element in the steel sheet material.

The steel sheet may further include, in percent by mass, one or more of Nb: 0.1% or less and V: 0.1% or less.

Further, the aforementioned coating composition includes, in percent by mass, for example, Al: 3.0% to 22.0%, Mg: 0.05% to 10.0%, Ti: 0% to 0.10%, B: 0% to 0.05%, Si: 0% to 2.0%, Fe: 0% to 2.0%, with the balance of Zn and unavoidable impurities.

As the method for manufacturing the above-described steel sheet hot-dip coated with a Zn—Al—Mg-based system, the method comprising the steps of hot rolling, pickling, and annealing and hot-dip coating with the Zn—Al—Mg system in a continuous hot-dip coating line performed sequentially, on the steel sheet material of the above-described composition, and the coiling temperature in the hot rolling is set to from 500° C. to 650° C. and the annealing temperature in the continuous hot-dip coating line is set to from 550° C. to 720° C.

Advantageous Effects of Invention

The present invention can provide a steel sheet hot-dip coated with a Zn—Al—Mg-based system, which has strength, ductility and hole-expandability that are suitable for working processes, such as press working and stretch flanging, and high corrosion resistance, and also provide a method for manufacturing the steel sheet.

DESCRIPTION OF EMBODIMENTS

Figure 1:
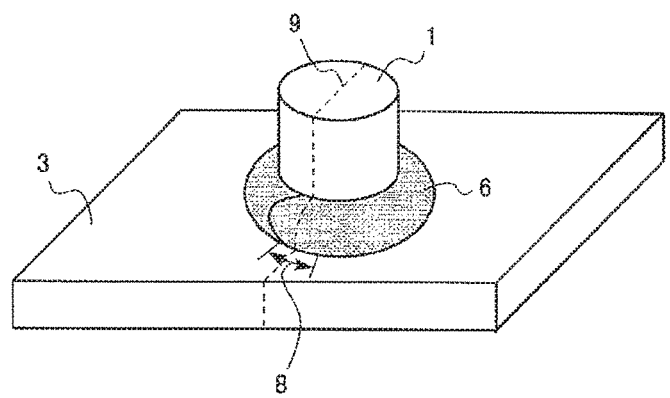
FIG. 1 is a perspective view illustrating the shape of a boss welding test material.

The composition, metallographic structure, and manufacturing method in accordance with the present invention will be explained hereinbelow in detail. In the steel composition and coating composition, "%" stands for "mass %", unless specifically stated otherwise.

<C: 0.005% to 0.08%>

C is an element that forms carbides including Ti, finely precipitates in the bainitic ferrite or ferrite structure, and is effective for strength enhancement. Where the C content is less than 0.005%, a strength of 400 MPa or greater is difficult to obtain, and where carbon is added in excess of 0.08%, the hole-expandability decreases due to the coarsening of the precipitates and formation of a hard second phase and cementite. The range of the C content is preferably 0.01% to 0.08%.

<Si: 0.8% or Less>

Si is an element effective in solid solution strengthening. However, where it is added in excess, an oxide is formed on the steel sheet surface during heating in a hot-dip coating line and the coatability is degraded. Therefore, the upper limit for the added amount thereof is set to 0.8%.

<Mn: 0.1% to 1.8%>

Mn is an element effective for strength enhancement. Where the content thereof is less than 0.1%, the strength of 400 MPa or greater is difficult to obtain, and where the content thereof exceeds 1.8%, segregation easily occurs and the hole-expandability is degraded. The range of the Mn content is preferably 0.5% to 1.8%.

<P: 0.05% or Less>

P is an element effective in solid solution strengthening. However, where it is added in excess of 0.05%, segregation easily occurs and burring ability is degraded. The range of the P content is preferably 0.025% or less. The content of P is not inclusive of 0.

<S: 0.02 or Less>

S forms sulfides with Ti and Mn and degrades the hole-expandability. Therefore, S is an element, the content of which needs to be reduced to a minimum. The range of the S content is preferably 0.005% or less, more preferably 0.003% or less. Further, S is an unavoidable impurity, and the content thereof is not inclusive of 0.

<N: 0.001% to 0.005%>

N generates BN, which remains as solid-soluted N in the steel, and reduces the amount of B which is effective in improving the liquid metal embrittlement cracking resistance. The investigation results indicate that while the N content is to be reduced to 0.005% or less, problems do not arise when N is present at about 0.001%. The range of the N content is preferably 0.001% to 0.004%.

<Ti: 0.02% to 0.2%>

Ti is an element that bonds with C and precipitates as fine Ti carbides, thereby effectively increasing the strength. Further, Ti has high affinity for N and fixes N contained in steel as TiN. Therefore, adding Ti is an extremely effective method for ensuring the amount of B which increases the liquid metal embrittlement cracking resistance. For such actions to be sufficient, it is necessary to add 0.02% or more of titanium, but where titanium is added in excess of 0.2%, processability is degraded. The Ti content ratio is preferably 0.03% to 0.2%.

<B: 0.0005% to 0.01%>

B is an element that increases interatomic bonding force by segregating on crystal grain boundaries and effectively suppresses the liquid metal embrittlement cracking. Ti also suppresses the austenite-ferrite transformation in the steel. Because of the suppression of the austenite-ferrite transformation, the precipitation temperature of Ti-based carbides is decreased and a contribution is made to the refinement of Ti-based carbides. No such effects are demonstrated when the content of boron is less than 0.0005%, and where boron is added in excess of 0.01%, borides are generated and processability is degraded. The B content range is preferably 0.001% to 0.005%.

<Al: 0.1% or Less>

Al is added as a deoxidizing material during steelmaking. Where it is added in excess of 0.1%, the ductility is decreased. The Al content range is preferably 0.05 or less. The Al content is not inclusive of 0.

<One or More of V 1.0% or Less and Nb: 0.1% or Less>

Nb and V are effective in preventing γ grains from coarsening during heating and hot rolling and effectively refine the ferrite grains. Further, similarly to Ti, they form composite carbides including C and make a contribution to strength increase. Therefore, one or more of those elements can be added, as necessary.

<Ti/C Equivalent Ratio: 0.4 to 1.5>

The Ti/C equivalent ratio is a value important in terms of improving the hole-expandability and ductility. The Ti/C equivalent ratio is defined by Formula (1):

$$\text{Ti/C equivalent ratio} = (\text{Ti}/48)/(\text{C}/12) \qquad (1)$$

where a symbol of each element in Formula (1) is substituted by the content (mass %) of the element in the steel sheet material.

Where the Ti/C equivalent ratio is less than 0.4, the amounts of the hard second phase and cementite are increased and the ratio of small-angle grain boundaries becomes 30% or less. Therefore, the hole-expandability is degraded. Meanwhile, where the Ti/C equivalent ratio exceeds 1.5, the ratio of small-angle grain boundaries exceeds 75% and, therefore, the ductility is decreased.

Since a strength suitable for working processes, such as press working and stretch flanging, is required, the tensile strength of the coated steel sheet in accordance with the present invention is prescribed to be 400 MPa or greater. Where the tensile strength is lower than this value, sufficient processability cannot be ensured. The tensile strength is preferably 500 MPa or greater, more preferably 590 MPa or greater.

<Metallographic Structure>

In the microstructure of the high-strength steel sheet hot-dip coated with a Zn—Al—Mg-based system in accordance with the present invention, a bainitic ferrite single phase or a structure including a bainitic ferrite phase and a ferrite phase exists as the main phase; the area ratio of the hard second phase and cementite is 3% or less; the ratio of small-angle boundaries with a difference in crystal orientation of 2° to 15° is 30% to 75%; and the average particle size of Ti-containing carbides is 20 nm or less. Those features will be explained hereinbelow.

Concerning a metallographic structure in which a bainitic ferrite single phase or a structure including bainitic ferrite and ferrite is the main phase and the area ratio of the hard second phase (bainite and pearlite) and cementite is 3% or less, a bainitic ferrite or ferrite structure with a low dislocation density is effective in terms of increasing the ductility and hole-expandability. Further, since the hard second structure and cementite serve as starting points for cracks during hole expansion processing and the hole-expandability is decreased, the area ratio thereof is set to 3% or less.

The "main phase", as referred to herein, means the phase remaining after the removal of the hard second phase and cementite in the metallographic structure of the steel sheet in accordance with the present invention.

The ratio of small-angle grain boundaries is set to 30% (inclusive) to 75% (inclusive) because where the ratio of small-angle grain boundaries is less than 30%, the hole-expandability is decreased, and where the ratio of small-angle grain boundaries is above 75%, the ductility decreases. The ratio of small-angle grain boundaries is preferably 40% to 75%.

Where the average particle size of Ti-including carbides is 20 nm or less, the Ti-containing carbides precipitate during hot rolling, and the strength is increased by the precipitation strengthening action. Further, fine precipitation is also effective in improving the hole-expandability. The results of various research demonstrate that an extremely effective average particle size of carbides dispersed in the bainitic ferrite or ferrite phase is 20 nm or less. The average particle size of the carbides is preferably 15 nm or less. The Ti-containing carbides are also inclusive of carbides of Nb, V, etc.

—Manufacturing Method

A high-strength steel sheet hot-dip coated with a Zn—Al—Mg-based system, which has excellent workability can be manufactured by sequentially performing, for example, on a steel material (continuously cast slab, or the like) with the adjusted composition, the steps of hot rolling, pickling, and annealing and hot-dip coating with the Zn—Al—Mg system in a continuous hot-dip coating line. Examples of manufacturing conditions for this manufacturing method are provided hereinbelow.

A steel slab with the above-described composition is heated at a heating temperature of 1150° C. to 1300° C., hot rolled at a finish temperature of 850° C. to 950° C., and then cooled to a coiling temperature at an average cooling rate of 20° C./sec or more. A hot-rolled steel strip is then obtained at the below-described coiling temperature. The steel strip is then pickled and transferred to a step of coating in a continuous hot-dip coating line under the below-described conditions.

<Setting Coiling Temperature in Hot Rolling to 500° C. to 650° C.>

Where the coiling temperature is less than 500° C., the precipitated amount of Ti-containing carbides is insufficient and the strength decreases. Further, the ratio of small-angle grain boundaries increases and the ductility decreases. Meanwhile where the coiling temperature exceeds 650° C., the Ti-containing carbides are coarsened, the strength decreases, and the hole-expandability is degraded.

<Annealing Temperature in Continuous Hot-Dip Coating Line: 550° C. to 720° C.>

Where the annealing temperature is less than 550° C., the steel sheet surface is not sufficiently reduced and the coatability is degraded. Meanwhile, where the annealing temperature exceeds 720° C., the carbides are coarsened, the strength decreases, and the hole-expandability is degraded. Further, the ratio of small-angle grain boundaries decreases and the hole-expandability is degraded.

<Coating with Zn—Al—Mg-Based System>

In the present invention, a conventional method for coating with a Zn—Al—Mg-based system can be used.

Al contained in the coating layer acts to increase the corrosion resistance of the coated steel sheet. The inclusion of Al in the coating bath also suppresses the generation of Mg oxide-based dross. For those actions to be sufficiently demonstrated, the Al content in the hot-dip coating needs to be 3.0% or more, preferably 4.0% or more. Meanwhile, where the Al content exceeds 22.0%, the growth of a Fe—Al alloy layer on the interface of the coating layer and the steel sheet material becomes significant and the coating adhesion is degraded. In order to ensure excellent coating adhesion, it is preferred that the Al content be 15.0% or less, more preferably 10.0% or less.

Mg in the coating layer acts to generate uniform corrosion products on the coating layer surface and increase significantly the corrosion resistance of the coated steel sheet. For this action to be demonstrated sufficiently, the Mg content in the hot-dip coating needs to be 0.05% or more, and it is desirable that the content of 2.0% or more be ensured. Meanwhile, where the Mg content exceeds 10.0%, it becomes more probable that the Mg oxide-based dross will be easily generated. In order to obtain a coating layer of a higher quality, it is preferred that the Mg content be 5.0% or less, more preferably 4.0% or less.

Where Ti and B are included in the hot-dip coating bath, the generation and growth of a $Zn_{11}Mg_2$ phase which creates spot-like appearance defects in the steel sheet hot-dip coated with a Zn—Al—Mg-based system is suppressed. The effect of suppressing the $Zn_{11}Mg_2$ phase is demonstrated even when Ti and B are included individually, but from the standpoint of greatly increasing the degree of freedom of the manufacturing conditions, it is desirable that Ti and B be included in combination. For those effects to be sufficiently demonstrated, the Ti content in the hot-dip coating is preferably 0.0005% or more and the B content is 0.0001% or more. However, where the Ti content increases too much, the precipitates of a Ti—Al system appear in the coating layer, depressions and protrusions called "pimples" appear on the coating layer, and the external appearance is degraded. Therefore, when Ti is added to the coating bath, the content thereof needs to be prescribed to be 0.10% or less, preferably 0.01% or less. Further, where the B content increases too much, the precipitates of an Al—B system or a Ti—B system appear and coarsen in the coating layer, depressions and protrusions called "pimples" also appear on the coating layer, and the external appearance is degraded.

Therefore, when B is added to the coating bath, the content range thereof needs to be 0.05% or less, preferably 0.005% or less.

Where Si is introduced in the hot-dip coating bath, the growth of the Fe—Al alloy layer is suppressed and processability of the steel sheet hot-dip coated with a Zn—Al—Mg-based system is improved. Further, Si in the coating layer is effective in maintaining the surface gloss and preventing the coating layer from blackening. For such an action of Si to be sufficiently demonstrated, the Si content in the hot-dip coating needs to be 0.005% or more. However, where Si is added in excess, the amount of dross in the hot-dip coating bath increases. Therefore, when Si is included in the coating bath, the content range thereof is 2.0% or less.

A certain amount of Fe is admixed to the hot-dip coating bath from the steel sheet material and parts of the pot. In the Zn—Al—Mg-based coating, the amount of Fe in the coating bath is allowed to be up to about 2.0%. For example, one or more of Ca, Sr, Na, rare earth metals, Ni, Co, Sn, Cu, Cr, and Mn may be admixed as other elements to the coating bath, but it is desirable that the total content thereof be 1 mass % or less. The hot-dip coating bath composition is reflected, substantially without changes, in the coating layer composition of the hot-dip coated steel sheet.

EXAMPLES

Steels of the compositions presented in Table 1 were melted, and slabs thereof were heated to 1250° C. Hot-rolled steel strips with a thickness of 2.6 mm were then obtained by hot rolling at a finish rolling temperature of 880° C. and a coiling temperature of 520° C. to 680° C. The coiling temperatures of the hot-rolled steel strips are presented in Table 2.

Steel sheet materials (starting sheets for coating) were obtained by pickling the hot-rolled steel strips, then annealing at 570° C. to 730° C. in a hydrogen-nitrogen mixed gas in a continuous hot-dip coating line, and cooling to about 420° C. at an average cooling rate of 5° C./sec. Steel sheets hot-dip coated with a Zn—Al—Mg-based system steel were then obtained by dipping into the melted Zn—Al—Mg-based coating bath having the below-described coating bath composition, while preventing the steel sheet surface from contact with the atmosphere, pulling up, and adjusting the adhered amount of coating to about 90 g/m$^2$ per one side by a gas wiping method. The coating bath temperature was about 410° C. The annealing temperature of each steel is presented in Table 2.

[Coating bath Composition (Mass %)]

Al: 6.0%, Mg: 3.0%, Ti: 0.002%, B: 0.0005%, Si: 0.01%, Fe: 0.1%, Zn: balance

[Average Particle Size of Ti-Containing Carbides]

A thin film fabricated from the sampled steel sheet hot-dip coated with a Zn—Al—Mg-based system was observed under a transmission electron microscope (TEM), the particle diameters (long diameters) of carbides present in a predetermined area including 30 or more of Ti-containing carbides were measured, and the average value thereof was taken as the average particle size of Ti-containing carbides.

[Ratio of Small-Angle Grain Boundaries]

The surface of a sample cut out from the sampled steel sheet hot-dip coated with a Zn—Al—Mg-based system was prepared by polishing at the cross section in the rolling direction and then electrolytic polishing. The difference in orientation between the crystal grain boundaries was then measured using an electron backscattering diffraction pattern (EBSP) method. The ratio of the total length of small-angle crystal grain boundaries with the difference in orientation between the crystal grain boundaries of 2° to 15° to

TABLE 1

| Steel | Chemical composition (mass %) | | | | | | | | | | | Ti/C equivalent ratio | Classification |
|---|---|---|---|---|---|---|---|---|---|---|---|---|---|
| | C | Si | Mn | P | S | Al | Ti | B | Nb | V | N | | |
| A | 0.043 | 0.60 | 1.10 | 0.017 | 0.002 | 0.043 | 0.110 | 0.0030 | | | 0.003 | 0.64 | Examples |
| B | 0.040 | 0.07 | 1.15 | 0.015 | 0.003 | 0.045 | 0.132 | 0.0030 | | | 0.002 | 0.83 | |
| C | 0.025 | 0.11 | 0.98 | 0.022 | 0.003 | 0.036 | 0.062 | 0.0035 | | | 0.004 | 0.62 | |
| D | 0.032 | 0.15 | 1.00 | 0.013 | 0.002 | 0.044 | 0.057 | 0.0030 | | | 0.003 | 0.45 | |
| E | 0.041 | 0.72 | 0.75 | 0.019 | 0.003 | 0.025 | 0.110 | 0.0031 | | | 0.003 | 0.67 | |
| F | 0.015 | 0.10 | 1.70 | 0.019 | 0.002 | 0.044 | 0.035 | 0.0032 | | | 0.002 | 0.58 | |
| G | 0.050 | 0.02 | 1.05 | 0.019 | 0.002 | 0.033 | 0.140 | 0.0030 | | | 0.002 | 0.70 | |
| H | 0.012 | 0.40 | 1.40 | 0.022 | 0.003 | 0.033 | 0.060 | 0.0045 | | | 0.003 | 1.25 | |
| I | 0.040 | 0.22 | 0.70 | 0.019 | 0.003 | 0.033 | 0.085 | 0.0030 | 0.08 | | 0.002 | 0.53 | |
| J | 0.038 | 0.31 | 0.80 | 0.023 | 0.003 | 0.033 | 0.070 | 0.0033 | | 0.07 | 0.003 | 0.46 | |
| K | 0.038 | 0.08 | 1.20 | 0.017 | 0.002 | 0.043 | 0.130 | 0.0035 | | | 0.003 | 0.86 | |
| L | 0.033 | 0.42 | 1.11 | 0.017 | 0.002 | 0.044 | 0.080 | 0.0031 | | | 0.003 | 0.61 | |
| M | 0.017 | 0.55 | 1.50 | 0.017 | 0.002 | 0.044 | 0.030 | 0.0083 | 0.04 | 0.05 | 0.003 | 0.44 | |
| N | 0.072 | 0.05 | 0.61 | 0.017 | 0.002 | 0.022 | 0.190 | 0.0010 | | | 0.003 | 0.66 | |
| O | 0.022 | 0.09 | 1.00 | 0.014 | 0.002 | 0.035 | 0.125 | 0.0033 | | | 0.002 | 1.42 | |
| P | 0.015 | 0.11 | 0.52 | 0.019 | 0.003 | 0.042 | 0.066 | 0.0029 | | | 0.002 | 1.10 | |
| Q | 0.007 | 0.08 | 0.98 | 0.022 | 0.003 | 0.039 | 0.025 | 0.0031 | | | 0.002 | 0.89 | |
| R | 0.025 | 0.09 | 0.70 | 0.019 | 0.003 | 0.044 | 0.061 | 0.0028 | | | 0.002 | 0.61 | |
| S | <u>0.090</u> | 0.60 | 0.55 | 0.017 | 0.002 | 0.022 | 0.118 | 0.0010 | | | 0.003 | <u>0.33</u> | Comparative examples |
| T | 0.030 | 0.73 | 1.41 | 0.020 | 0.003 | 0.041 | <u>0.010</u> | 0.0030 | | | 0.002 | <u>0.08</u> | |
| U | 0.017 | 0.40 | 1.10 | 0.018 | 0.003 | 0.033 | 0.110 | 0.0030 | | | 0.002 | <u>1.62</u> | |
| V | 0.036 | 0.20 | <u>1.93</u> | 0.020 | 0.003 | 0.044 | 0.090 | 0.0030 | | | 0.002 | 0.63 | |
| W | 0.022 | 0.30 | 0.54 | 0.018 | 0.003 | 0.044 | 0.060 | <u>0.0003</u> | | | 0.003 | 0.68 | |
| X | 0.044 | 0.60 | 1.07 | <u>0.065</u> | 0.003 | 0.033 | 0.110 | 0.0030 | | | 0.002 | 0.63 | |
| Y | <u>0.004</u> | 0.44 | 1.22 | 0.017 | 0.002 | 0.041 | 0.030 | 0.0033 | | | 0.002 | <u>1.88</u> | |
| Z | 0.015 | 0.15 | <u>0.08</u> | 0.019 | 0.002 | 0.042 | 0.050 | 0.0035 | | | 0.002 | 0.83 | |
| ZZ | 0.033 | 0.05 | 1.22 | 0.019 | 0.002 | 0.038 | <u>0.220</u> | 0.0033 | | | 0.003 | <u>1.67</u> | |

Underlined: outside a range specified by the present invention the total length of crystal grain boundaries with the similarly measured difference in orientation between the crystal grain boundaries of 2° to 180° is also shown in Table 2.

The following device and conditions were used for the measurements.

Observation device: field-emission scanning electron microscope JSM-6500F manufactured by JEOL.
EBSP system: OIM Data Collection 5.21 manufactured by EDAX-TSL.
Measurement range/measurement interval: 100×100 µm/0.3 µm×1 view field.

[Area Ratio of Second Hard Phase and Cementite]

A sample cut out from the sampled steel sheet hot-dip coated with a Zn—Al—Mg-based system was polished at the cross section in the rolling direction and etched with a picral reagent. The area ratio of the hard second phase and cementite calculated by image analysis for the observed structure is also presented in Table 2.

[Tensile Properties]

The tensile strength TS and total elongation T. El were determined according to JIS 22241 by using a JIS No. 5 sample sampled such that the longitudinal direction of the sample was perpendicular to the rolling direction of the steel sheet material.

A TS×T. El balance of 13,000 or greater was determined to be acceptable.

[Hole-Expandability]

A 90×90 mm sample was sampled from the steel sheet hot-dip coated with a Zn—Al—Mg-based system and used as a blank for a hole-expandability test. A hole was punched in the center of the blank with a punch and a die. The diameter $D_0$ of the initial hole was 10.0 mm, and the die with a clearance constituting 12% of the sheet thickness was selected. A punch with an apex angle of 60° was inserted into the as-punched hole from the side opposite that of the burrs, and the initial hole was expanded. The movement rate of the punch in this case was 10 mm/min. The punch was stopped when the hole in the steel sheet expanded and a crack penetrated in the sheet thickness direction. The inner diameter $D_b$ of the hole at this time was measured. The hole expansion ratio λ defined as $(D_b-D_o)/D_o×100(\%)$ was then determined.

A TS×λ balance of 40,000 or greater was determined to be acceptable.

[Evaluation of Liquid Metal Embrittlement Cracking]

The liquid metal embrittlement characteristic was evaluated by performing a welding test according to the following procedure.

A 100 mm×75 mm sample was cut out from a steel sheet hot-dip coated with a Zn—Al—Mg-based system and was taken as a sample for evaluating a maximum crack depth caused by liquid metal embrittlement. In the welding test, "boss welding" was performed to produce a boss welding material with the external appearance depicted in FIG. 1, and the crack occurrence state was investigated by observing the weld cross section. Thus, a boss (protrusion) 1 formed of rod steel (SS400 material conforming to the JIS) with a diameter of 20 mm and a length of 25 mm was vertically placed in the central portion of the sheet surface of a sample 3, and the boss 1 was joined by arc welding to the sample 3. A welding wire YGW12 was used, a welding bead 6 went round the boss from the welding start point, the welding was then slightly advanced even after the welding start point was reached to pass over the welding start point. The welding was ended when an overlapping portion 8 of the welding bead appeared. The welding was performed under the following conditions: 190 A, 23 V, welding rate 0.3 m/min, shielding gas: Ar-20 vol. % $CO_2$, shielding gas flow rate: 20 L/min.

Figure 2:
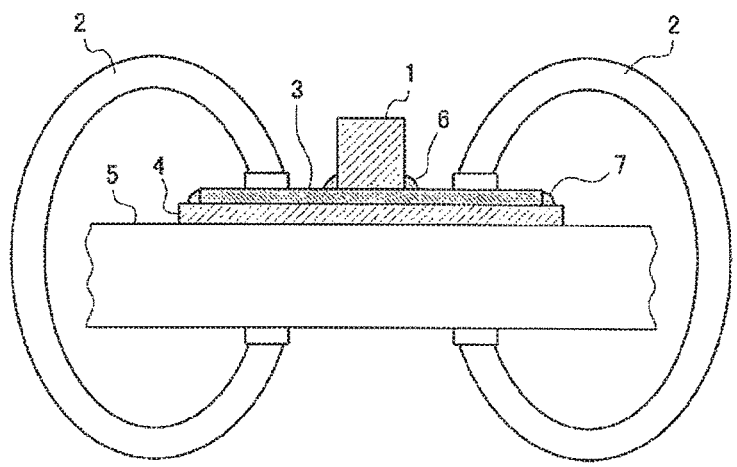
FIG. 2 is a cross-sectional view illustrating the procedure for fabricating the boss welding test material.

The sample 3 was joined in advance to the restraining plate 4, as depicted in FIG. 2, and such a configuration was used during the welding. The joined body was obtained by preparing the 120 mm×95 mm×4 mm (thickness) restraining plate 4 (SS400 material conforming to the JIS), placing the sample 3 in the center of the plate surface, and then welding the entire circumference of the sample 3 to the restraining plate 4. The boss welding material was fabricated by fixing the joined body (sample 3 and restraining plate 4) with a clamp 2 on a horizontal test table 5 and performing the boss welding in this state.

After the boss welding, the joined body of the boss 1—sample 3—restraining plate 4 was cut along a cut surface 9 passing through the central axis of the boss 1 and the overlapping portion 8 of the bead, the cut surface 9 was observed under a microscope, the maximum depth of the cracks observed in sample 3 was measured, and the value obtained was taken as a maximum base material crack depth. These cracks correspond to the liquid metal embrittlement cracks. The maximum base material depth of 0.1 mm or less was evaluated as acceptable and that above 0.1 mm as unacceptable.

TABLE 2

| | | Manufacturing conditions | | Microstructure | | | |
| | | Coiling temperature in hot rolling | Annealing temperature in coating line | | Average particle size of carbides | Area ratio of small-angle grain | Area ratio of hard second phase and |
| No. | steel | (° C.) | (° C.) | Structure* | (nm) | boundaries (%) | cementite (%) |
|---|---|---|---|---|---|---|---|
| 1 | A | 590 | 630 | BF | 8 | 62 | 0 |
| 2 | B | 580 | 620 | BF | 7 | 65 | 0 |
| 3 | C | 590 | 640 | BF | 6 | 66 | 0 |
| 4 | D | 630 | 630 | BF + F | 8 | 47 | 2 |
| 5 | E | 560 | 590 | BF | 12 | 60 | 0 |
| 6 | F | 590 | 620 | BF | 8 | 61 | 1 |
| 7 | G | 620 | 610 | BF | 11 | 65 | 0 |
| 8 | H | 640 | 630 | BF | 11 | 67 | 0 |
| 9 | I | 520 | 610 | BF | 13 | 50 | 1 |
| 10 | J | 630 | 640 | BF | 8 | 45 | 2 |
| 11 | K | 580 | 620 | BF | 6 | 65 | 0 |
| 12 | L | 570 | 670 | BF | 12 | 61 | 0 |
| 13 | M | 600 | 570 | BF | 11 | 43 | 0 |
| 14 | N | 610 | 640 | BF | 11 | 62 | 1 |
| 15 | O | 570 | 660 | BF | 7 | 67 | 0 |

TABLE 2-continued

| | | | | | | | |
|---|---|---|---|---|---|---|---|
| 16 | P | 600 | 680 | BF + F | 8 | 32 | 1 |
| 17 | Q | 600 | 670 | BF + F | 8 | 31 | 1 |
| 18 | R | 610 | 710 | BF + F | 9 | 39 | 1 |
| 19 | S | 580 | 600 | F + P | 13 | 35 | <u>9</u> |
| 20 | T | 640 | 600 | F | <u>22</u> | 5 | <u>7</u> |
| 21 | U | 600 | 620 | BF | 15 | <u>79</u> | 0 |
| 22 | V | 570 | 590 | BF | 9 | 66 | 0 |
| 23 | W | 590 | 600 | BF + F | <u>32</u> | <u>22</u> | 0 |
| 24 | X | 580 | 590 | BF | 14 | 65 | 0 |
| 25 | Y | 620 | 630 | F | 18 | <u>19</u> | 0 |
| 26 | Z | 600 | 640 | F | 16 | <u>5</u> | 0 |
| 27 | ZZ | 610 | 640 | BF | 18 | <u>79</u> | 0 |
| 28 | A | <u>680</u> | 640 | BF + F | <u>35</u> | <u>5</u> | 0 |
| 29 | A | 620 | <u>730</u> | BF | <u>31</u> | 59 | 0 |

| | Tensile properties | | | Hole-expandability | | Liquid metal embrittlement | |
|---|---|---|---|---|---|---|---|
| No. | TS (MPa) | T.El (%) | TS × T.El (MPa · %) | λ (%) | TS × λ (MPa · %) | crack resistance | Classification |
| 1 | 820 | 19.0 | 15580 | 80 | 65600 | ○ | Examples |
| 2 | 830 | 17.4 | 14442 | 79 | 65570 | ○ | |
| 3 | 632 | 22.8 | 14410 | 133 | 84056 | ○ | |
| 4 | 630 | 24.0 | 15120 | 99 | 62370 | ○ | |
| 5 | 840 | 19.0 | 15960 | 80 | 67200 | ○ | |
| 6 | 605 | 24.1 | 14581 | 110 | 66550 | ○ | |
| 7 | 831 | 21.0 | 17451 | 75 | 62325 | ○ | |
| 8 | 602 | 23.0 | 13846 | 170 | 102340 | ○ | |
| 9 | 905 | 17.0 | 15385 | 63 | 57015 | ○ | |
| 10 | 878 | 18.3 | 16067 | 71 | 62338 | ○ | |
| 11 | 822 | 19.2 | 15782 | 93 | 76446 | ○ | |
| 12 | 888 | 16.0 | 14208 | 77 | 68376 | ○ | |
| 13 | 698 | 21.0 | 14658 | 82 | 57236 | ○ | |
| 14 | 933 | 15.8 | 14741 | 63 | 58779 | ○ | |
| 15 | 688 | 19.5 | 13416 | 130 | 89440 | ○ | |
| 16 | 420 | 31.0 | 13020 | 220 | 92400 | ○ | |
| 17 | 445 | 30.0 | 13350 | 210 | 93450 | ○ | |
| 18 | 510 | 27.0 | 13770 | 185 | 94350 | ○ | |
| 19 | 899 | 18.0 | 16182 | 43 | <u>38657</u> | ○ | Comparative examples |
| 20 | 490 | 33.0 | 16170 | 65 | <u>31850</u> | ○ | |
| 21 | 700 | 16.2 | 11340 | 135 | 94500 | ○ | |
| 22 | 880 | 16.3 | 14344 | 44 | <u>38720</u> | ○ | |
| 23 | <u>372</u> | 35.5 | 13206 | 122 | 45384 | X | |
| 24 | 822 | 17.7 | 14549 | 33 | <u>27126</u> | ○ | |
| 25 | <u>378</u> | 37.0 | 13986 | 180 | 68040 | ○ | |
| 26 | <u>387</u> | 35.0 | 13545 | 230 | 89010 | ○ | |
| 27 | 879 | 14.0 | <u>12306</u> | 83 | 72957 | ○ | |
| 28 | 771 | 22.0 | 16962 | 46 | <u>35466</u> | ○ | |
| 29 | 781 | 21.0 | 16401 | 44 | <u>34364</u> | ○ | |

*BF: bainitic ferrite, F: ferrite, P: pearlite

In the table, No. 1 to 18 of the present invention represent high-strength steel sheets hot-dip coated with a Zn—Al—Mg-based system which excel in the so-called strength—ductility balance and strength—hole-expandability balance and in which the tensile strength TS is 400 MPa or greater, the TS×T. El balance is 13,000 MPa·% or greater, and the TS×λ balance is 40,000 MPa·% or greater.

By contrast, in No. 19, since the C amount is high and the Ti/C equivalent ratio is low, the area ratio of the hard second phase+cementite is high and the TS×λ balance is low. In No. 20, since the Ti amount is low and the Ti/C equivalent ratio is low, the area ratio of the hard second phase+cementite is high and the TS×λ balance is low. In No. 21, since the Ti/C equivalent ratio is high, the small-angle grain boundary area ratio is high and the TS×T. El balance is low. In No. 22, since the Mn amount is large, the TS·λ balance is low. In No. 23, since the B amount is small, sufficient tensile strength is not obtained and the LMEC resistance is lowered. In No. 24, since the P amount is large, the TS×λ balance is low. In No. 25, since the C amount is small, sufficient tensile strength is not obtained, and since the Ti/C equivalent ratio is high, the small-angle grain boundary area ratio is high and the TS×λ. El balance is low. In No. 26, since the Mn amount is small, sufficient tensile strength is not obtained. In No. 27, since the Ti amount is large and the Ti/C equivalent ratio is high, the small-angle grain boundary area ratio is high and the TS×λ. El balance is low. In No. 28 and No. 29 the particle size of Ti carbides is large and the Ti×λ balance is low because the coiling temperature in hot rolling is high in the former and the annealing temperature in the continuous hot-dip coating line is high in the latter.

Figure 3:
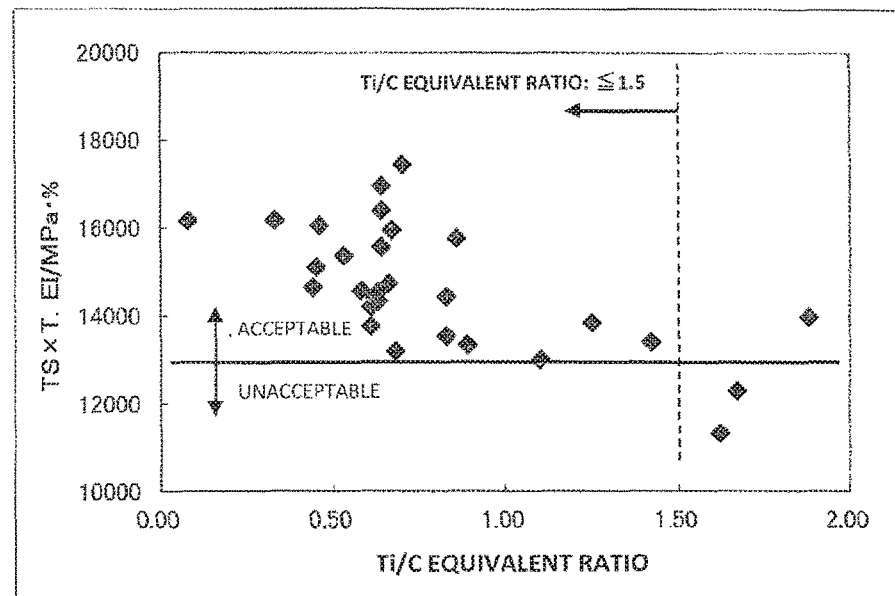
FIG. 3 illustrates the relationship between the TS×T. El balance and Ti/C equivalent ratio.
Figure 4:
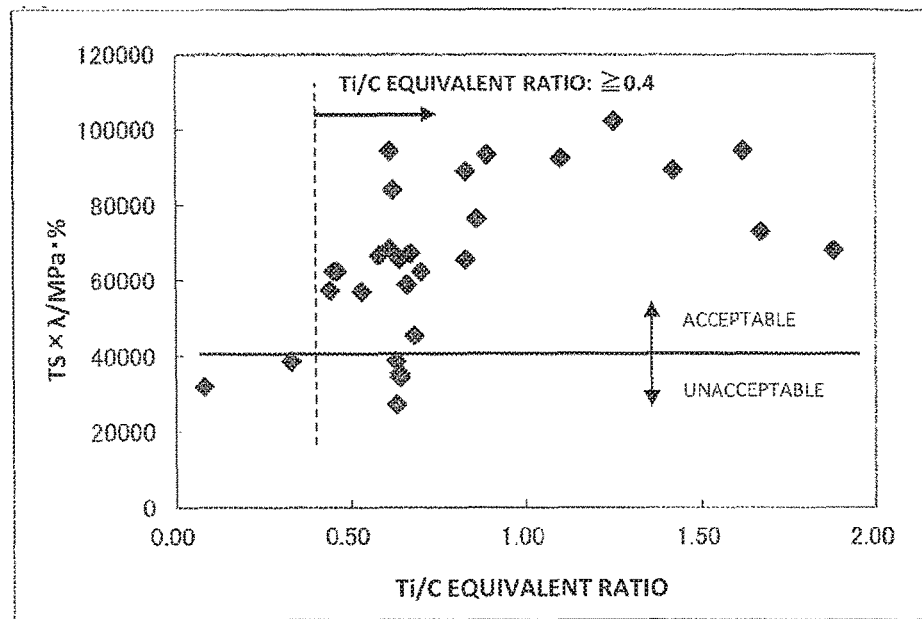
FIG. 4 illustrates the relationship between the TS×λ balance and Ti/C equivalent ratio.

FIG. 3 shows the relationship between the TS×λ. El balance and Ti/C equivalent ratio, and FIG. 4 shows the relationship between TS×λ balance and Ti/C equivalent ratio. It is clear that where the Ti/C equivalent ratio is 0.4 to 1.5, it is possible to obtain a high-strength steel sheet hot-dip coated with a Zn—Al—Mg-based system, which excels in both the ductility and the hole-expandability.

REFERENCE SIGNS LIST

1 Boss
2 Clamp
3 Test sample

4 Restraining plate
5 Test table
6 Welding bead
7 Welding bead of full-circumference welding portion of test sample
8 Overlapping portion of weld bead
9 Cut surface

The invention claimed is:

1. A high-strength steel sheet hot-dip coated with a Zn—Al—Mg-based system and having a tensile strength of 400 MPa or greater and excellent workability, the steel sheet having a layer hot-dip coated with a Zn—Al—Mg-based system on the surface of a steel sheet material, wherein
    the steel sheet material contains, in percent by mass, C: 0.005% to 0.08%, Si: 0.8% or less, Mn: 0.1% to 1.8%, P: 0.05% or less, S: 0.02% or less, N: 0.001% to 0.005%, Ti: 0.02% to 0.2%, B: 0.0005% to 0.01%, and Al: 0.1% or less, with the balance of Fe and unavoidable impurities; a Ti/C equivalent ratio represented by Formula (1) below is 0.4 to 1.5; a bainitic ferrite single phase or a phase comprising a bainitic ferrite phase and a ferrite phase exists as a main phase; a total area ratio of a hard second phase and cementite is 3% or less; the ratio of small-angle boundaries with a difference in crystal orientation of 2° to 15° is 30% to 75%; and Ti-containing carbides having an average particle size of 20 nm or less are dispersed and precipitated:

$$\text{Ti/C equivalent ratio} = (\text{Ti}/48)/(\text{C}/12) \quad (1)$$

wherein a symbol of each element in Formula (1) is substituted by the content (mass %) of the element in the steel sheet material.

2. The high-strength steel sheet hot-dip coated with a Zn—Al—Mg-based system according to claim 1, wherein the steel sheet material further contains, in percent by mass, one or more of Nb: greater than 0% and less than or equal to 0.1% and V: greater than 0% and less than or equal to 0.1%.

3. The high-strength steel sheet hot-dip coated with a Zn—Al—Mg-based system according to claim 1, wherein a coating composition of the steel sheet hot-dip coated with a Zn—Al—Mg-based system includes, in percent by mass, Al: 3.0% to 22.0%, Mg: 0.05% to 10.0%, Ti: 0% to 0.10%, B: 0% to 0.05%, Si: 0% to 2.0%, Fe: 0% to 2.0%, with the balance of Zn and unavoidable impurities.

4. A method for manufacturing a high-strength steel sheet hot-dip coated with a Zn—Al—Mg-based system and having a tensile strength of 400 MPa or greater and excellent workability according to claim 1, in which a steel sheet material contains, in percent by mass, C: 0.005% to 0.08%, Si: 0.8% or less, Mn: 0.1% to 1.8%, P: 0.05% or less, S: 0.02% or less, N: 0.001% to 0.005%, Ti: 0.02% to 0.2%, B: 0.0005% to 0.01%, and Al: 0.1% or less, with the balance of Fe and unavoidable impurities, the steel sheet material having a Ti/C equivalent ratio represented by Formula (1) below of 0.4 to 1.5,
    the method comprising the steps of hot rolling, pickling, and annealing and hot-dip coating with the Zn—Al—Mg system in a continuous hot-dip coating line performed sequentially, on the steel sheet material, wherein a finishing temperature in hot rolling is from 850° C. to 880° C., a coiling temperature in the hot rolling is from 500° C. to 650° C. and an annealing temperature in the continuous hot-dip coating line is from 550° C. to 720° C.:

$$\text{Ti/C equivalent ratio} = (\text{Ti}/48)/(\text{C}/12) \quad (1)$$

wherein a symbol of each element in Formula (1) is substituted by the content (mass %) of the element in the steel sheet material.

5. The method for manufacturing a high-strength steel sheet hot-dip coated with a Zn—Al—Mg-based system and having a tensile strength of 400 MPa or greater and excellent workability according to claim 4, wherein
    the steel sheet material further contains, in percent by mass, one or more of Nb: greater than 0% and less than or equal to 0.1% and V: greater than 0% and less than or equal to 0.1%.

6. The method for manufacturing a high-strength steel sheet hot-dip coated with a Zn—Al—Mg-based system and having a tensile strength of 400 MPa or greater and excellent workability according to claim 4, wherein
    a coating composition of the steel sheet hot-dip coated with a Zn—Al—Mg-based system includes, in percent by mass, Al: 3.0% to 22.0%, Mg: 0.05% to 10.0%, Ti: 0% to 0.10%, B: 0% to 0.05%, Si: 0% to 2.0%, Fe: 0% to 2.0%, with the balance of Zn and unavoidable impurities.

* * * * *